US009621936B2

(12) United States Patent
Ohde et al.

(10) Patent No.: US 9,621,936 B2
(45) Date of Patent: Apr. 11, 2017

(54) INFORMATION PROVIDING DEVICE, INFORMATION PROVIDING METHOD, AND COMPUTER PROGRAM

(71) Applicant: Sony Corporation, Tokyo (JP)

(72) Inventors: Junya Ohde, Kanagawa (JP); Kazuhito Sumiyoshi, Tokyo (JP); Hideki Asazu, Tokyo (JP); Tomoyuki Yamamoto, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/189,189

(22) Filed: Feb. 25, 2014

(65) Prior Publication Data

US 2014/0201782 A1 Jul. 17, 2014

Related U.S. Application Data

(63) Continuation of application No. 10/568,969, filed as application No. PCT/JP2004/009843 on Jul. 9, 2004, now abandoned.

(30) Foreign Application Priority Data

Aug. 28, 2003 (JP) .................................. 2003-303915

(51) Int. Cl.
*H04N 21/258* (2011.01)
*G06F 17/30* (2006.01)
(Continued)

(52) U.S. Cl.
CPC ... *H04N 21/25891* (2013.01); *G06F 17/3084* (2013.01); *G06F 17/30817* (2013.01);
(Continued)

(58) Field of Classification Search
CPC ......... H04N 21/4532; H04N 21/44222; H04N 21/482
(Continued)

(56) References Cited

U.S. PATENT DOCUMENTS

| 5,353,121 A | 10/1994 | Young et al. |
| 6,005,597 A * | 12/1999 | Barrett ............... H04N 5/44543 348/564 |

(Continued)

FOREIGN PATENT DOCUMENTS

| JP | 5-227494 | 9/1993 |
| JP | 6-124309 | 5/1994 |

(Continued)

OTHER PUBLICATIONS

Notification of Reasons for Refusal issued in counterpart Japanese Patent Applications No. 2008-110697 mailed Mar. 1, 2011 (English translation only).

*Primary Examiner* — Nicholas Corbo
*Assistant Examiner* — Alexander Q Huerta
(74) *Attorney, Agent, or Firm* — Oblon, McClelland, Maier & Neustadt, L.L.P.

(57) ABSTRACT

Log information includes items of information that identify one or more of program titles and performers that are selected by a user as being preferred. Identifiers are displayed, where each of the identifiers identifies an item of information included in the log information. An input to select one of the identifiers is received, and broadcast information for the program title or performer corresponding to the selected identifier is acquired. The broadcast information includes one or more broadcast times of contents that have the program title or that include the performer. The broadcast information is displayed to include the one or more broadcast times and an input is received to select a broadcast time of a content. Detailed information for the (Continued)

content and the broadcast time are displayed when the input to select the broadcast time of the content is received.

14 Claims, 12 Drawing Sheets

(51) Int. Cl.
*H04N 21/2668* (2011.01)
*H04N 21/442* (2011.01)
*H04N 21/466* (2011.01)
*H04N 21/658* (2011.01)

(52) U.S. Cl.
CPC ... *G06F 17/30849* (2013.01); *H04N 21/2668* (2013.01); *H04N 21/44222* (2013.01); *H04N 21/4667* (2013.01); *H04N 21/6582* (2013.01)

(58) Field of Classification Search
USPC .................................. 725/14, 39, 40, 46, 53
See application file for complete search history.

(56) References Cited

U.S. PATENT DOCUMENTS

| | | | |
|---|---|---|---|
| 6,742,184 B1* | 5/2004 | Finseth et al. .................. 725/52 | |
| 6,850,691 B1* | 2/2005 | Stam .................. G06F 11/1417 | |
| | | | 348/E5.103 |
| 7,293,275 B1 | 11/2007 | Krieger et al. | |
| 8,132,204 B2* | 3/2012 | Haberman ........ G06F 17/30817 | |
| | | | 725/138 |
| 2002/0044144 A1 | 4/2002 | Inoue | |
| 2002/0059313 A1* | 5/2002 | Yoon .................. H04H 60/33 | |
| 2002/0104081 A1* | 8/2002 | Candelore et al. ............... 725/9 | |
| 2002/0129368 A1* | 9/2002 | Schlack ................ G06Q 30/02 | |
| | | | 725/46 |
| 2002/0140728 A1* | 10/2002 | Zimmerman ................. 345/745 | |
| 2003/0066090 A1 | 4/2003 | Traw et al. | |
| 2003/0084450 A1 | 5/2003 | Thurston et al. | |
| 2003/0117428 A1* | 6/2003 | Li ..................... G06F 17/30787 | |
| | | | 715/716 |
| 2003/0177498 A1 | 9/2003 | Ellis et al. | |
| 2003/0212708 A1 | 11/2003 | Potrebic et al. | |
| 2003/0237095 A1* | 12/2003 | Srinivas .................. H04H 60/46 | |
| | | | 725/46 |
| 2004/0117831 A1* | 6/2004 | Ellis et al. ....................... 725/53 | |
| 2004/0210932 A1 | 10/2004 | Mori et al. | |
| 2004/0221308 A1* | 11/2004 | Cuttner .............. H04N 5/44543 | |
| | | | 725/46 |
| 2005/0015803 A1 | 1/2005 | Macrae et al. | |
| 2005/0144499 A1* | 6/2005 | Narahara ............... H04H 60/31 | |
| | | | 714/1 |
| 2006/0250650 A1* | 11/2006 | Narahara ............... H04H 60/37 | |
| | | | 358/1.18 |
| 2007/0157220 A1* | 7/2007 | Cordray .................. H04H 60/65 | |
| | | | 725/9 |
| 2008/0040745 A1 | 2/2008 | Banker et al. | |
| 2009/0077589 A1 | 3/2009 | Boyer et al. | |

FOREIGN PATENT DOCUMENTS

| | | |
|---|---|---|
| JP | A 8-111823 | 4/1996 |
| JP | A 11-308547 | 11/1999 |
| JP | 2000-112976 | 4/2000 |
| JP | A 2000-112977 | 4/2000 |
| JP | 2000-172394 | 6/2000 |
| JP | A 2000-287189 | 10/2000 |
| JP | 2001-54034 | 2/2001 |
| JP | 2001-157134 | 6/2001 |
| JP | 2001-285765 | 10/2001 |
| JP | 2002-112186 | 4/2002 |
| JP | 2002-118838 | 4/2002 |
| JP | 2002-125169 | 4/2002 |
| JP | 2002-176593 | 6/2002 |
| JP | 2003-153304 | 5/2003 |
| JP | A 2003-163949 | 6/2003 |
| JP | 2003-189333 | 7/2003 |
| JP | 2003-209755 | 7/2003 |
| JP | A 2003-189206 | 7/2003 |

\* cited by examiner

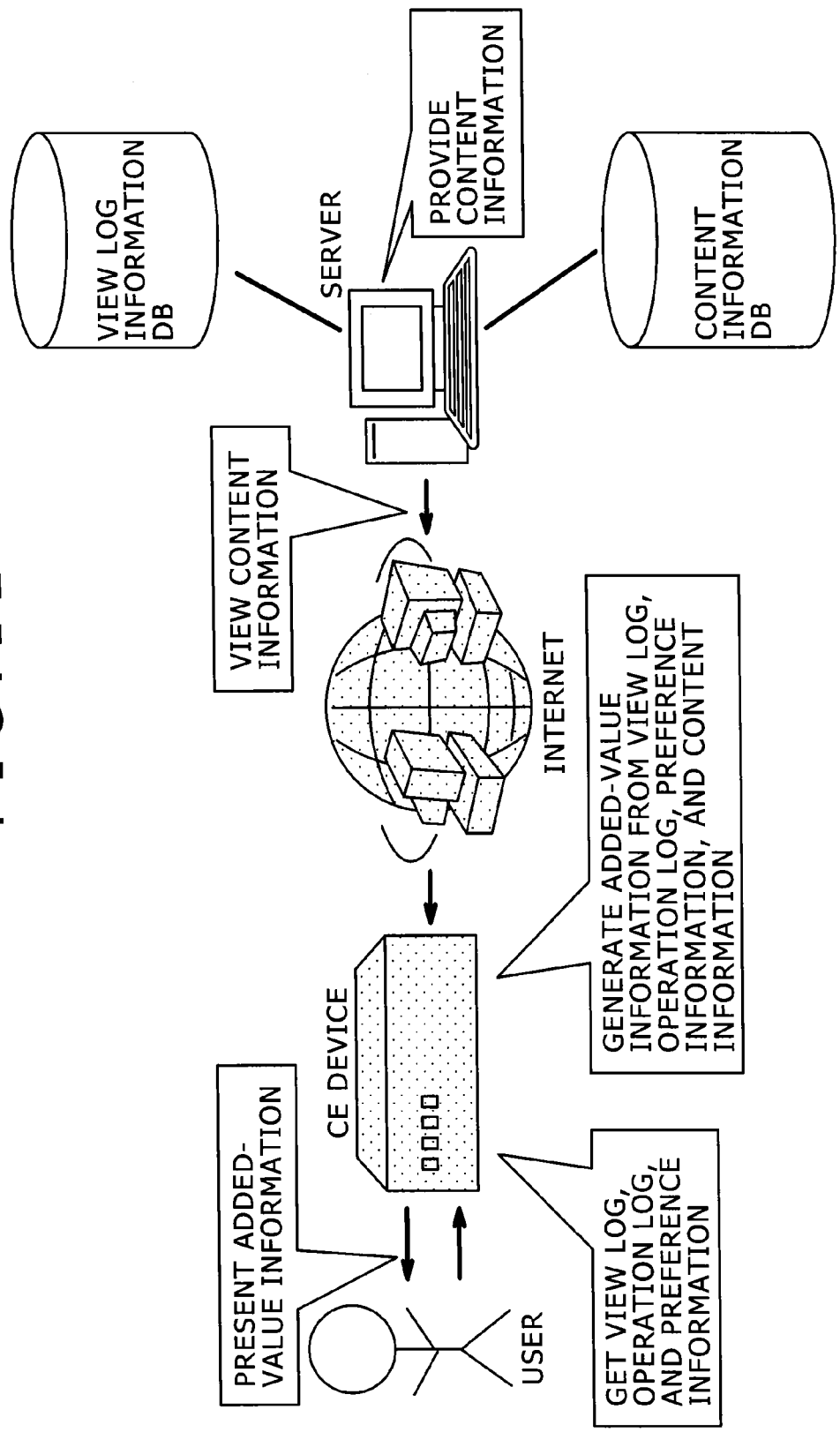

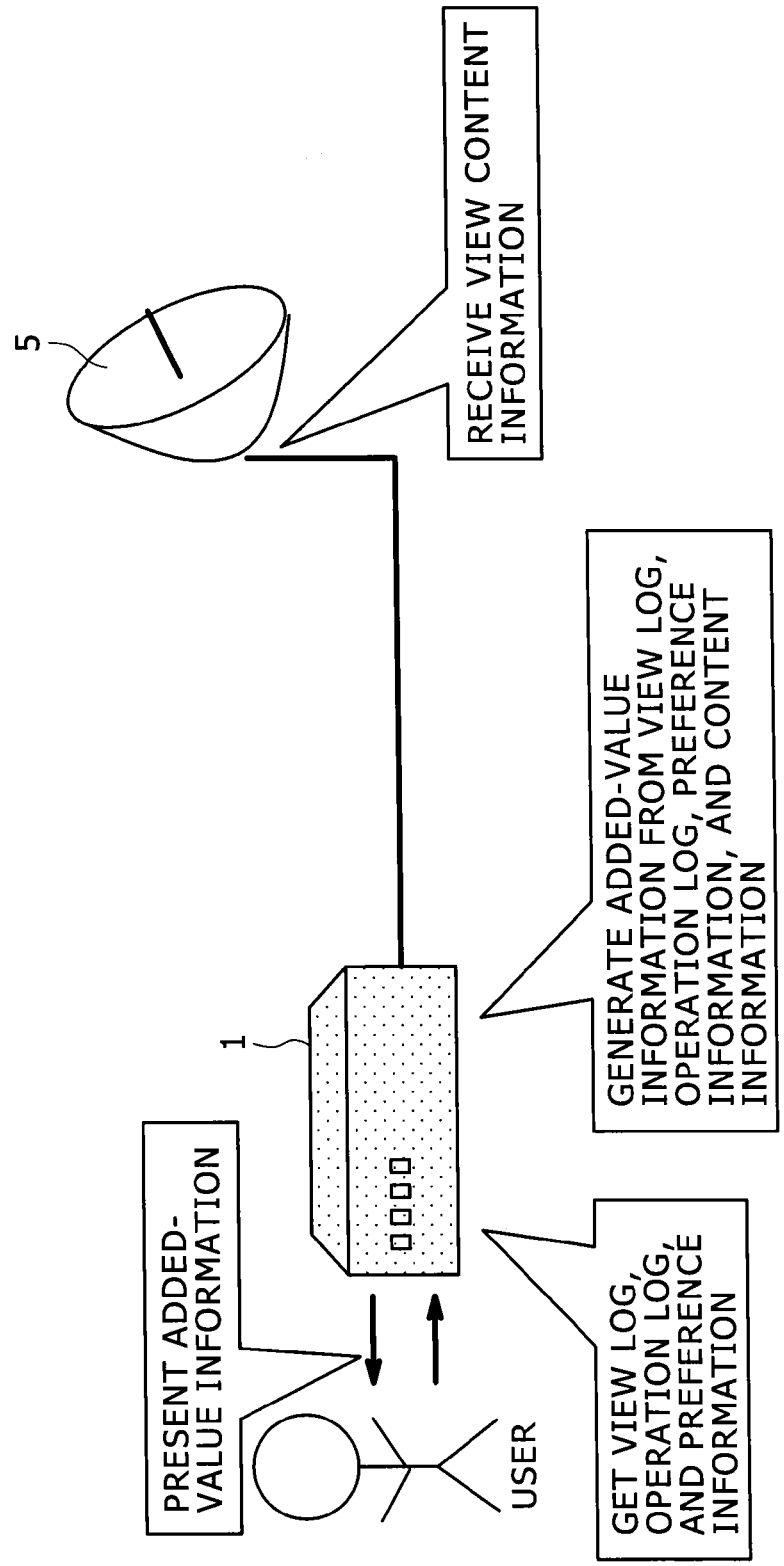

INFORMATION PROVIDING DEVICE, INFORMATION PROVIDING METHOD, AND COMPUTER PROGRAM

CROSS-REFERENCE TO RELATED APPLICATIONS

This application is a continuation of and claims the benefit of priority under 35 U.S.C. §120 from U.S. application Ser. No. 10/568,969, filed Oct. 10, 2006, the entire contents of which is incorporated herein by reference, and which is a national stage of International Application No. PCT/JP04/09843, filed Jul. 9, 2004, which is based upon and claims the benefit of priority under 35 U.S.C. §119 from prior Japanese Patent Application No. 2003-303915, filed Aug. 28, 2003.

TECHNICAL FIELD

The present invention relates generally to an information providing apparatus and information providing method and computer program and, more particularly, to an information providing apparatus and information processing method and computer program for presenting useful information to users who record, timer-record, or view broadcast content.

To be more specific, the present invention relates to an information providing apparatus, an information providing method, and a computer program for providing information for supporting users who realtime-record, timer-record, or view broadcast content in content viewing selection, and other added-value information and, more particularly, to an information providing apparatus, an information providing method, and a computer program for providing viewing selection information in which user preference is made apparent on the basis of user viewing logs for example, and other value-added information.

BACKGROUND ART

Broadcasting is indispensable in the information-oriented society of today. Especially, telecasting that directly sends both audio and video information to audience has great influences on societies. Broadcasting technologies encompass a wide range of technological fields, such as signal processing, signal transmission and reception, and audio/video information processing, for example. Transmission forms in which program content is provided to users are various; for example, the broadcasting based on the radio such as ground and satellite waves, the cable television, and the network programs provided by use of computer communication.

The popularization of the television has almost been saturated, one more receives being found in almost all homes, the broadcast content distributed from each broadcasting station being viewed by general public. Another form of viewing broadcast content is that received content is recorded first on the viewer side and reproduced later when desired, for example.

The recent advance of digital technologies makes it practicable to store huge amounts of AV data consisting of video and audio data. For example, it is affordable for users to purchase HDDs (Hard Disc Drives) of capacities of several tens of GB or higher at comparatively low costs. Accordingly, video recorders based on the HDD and personal computers (PCs) having television program recording/reproducing capabilities, for example, have been introduced.

The HDD permits random access to the data recorded thereto. Therefore, unlike the conventional video tape, the reproduction of recorded content need not feed forward each recorded program sequentially from the beginning thereof. The HDD permits access directly to any desired program (or a particular scene or topic in each program) for reproduction. The viewing form in which a receiver (for example, a television receiver or a video recording/reproducing unit) having a mass storage such as a hard disk unit is used to receive broadcast content that is stored therein for later reproduction is referred to as "server-type broadcasting".

According to a server-type broadcasting system, it becomes practicable that not only video and audio data be viewed realtime as with the normal television reception but also be distributed in advance for later reproduction at specified times, and, by use of the information distributed along with these video and audio data, scene search and digest viewing be executed.

However, as the HDD increases in storage size, systems capable of recording programs for as long as several tens of hours may make it difficult for users to make up their minds with which of many stored programs the viewing is to start. Therefore, content would be stored in vain unless programs desired by a user are efficiently selected to be realtime recorded or timer recorded and the viewing of stored content is supported by some means. If huge amounts of recorded content are stored on recording device, the user must sort out because it is difficult for the user to view all the stored content. Namely, it is considered to be important to provide efficient timer recording operation capabilities for users to have beneficial television program viewing activities.

Meanwhile, so-called EPG (Electronical Program Guide) is known which is obtained by superimposing a program guide for television program selection onto an image signal to be displayed on a display device of the receiving side. On the side of the CE device such as a HDD recorder, an EPG may be obtained concurrently with the recording of a broadcast program and the obtained EPG is presented when the user reproduces and views the recorded program, thereby providing a certain viewing support effect.

EPG systems are divided into a VBI (Vertical Blanking Interval) scheme (refer to patent document 1 for example) and a digital satellite scheme as used in DSS (Digital Satellite System (a trademark of Hughes Communication) (refer to patent document 2 for example).

In the VBI scheme, VBI data configuring each EPG is inserted at a position not affecting an original image of each horizontal scan line in ground-wave telecasting in the normal (VHF (Very High Frequency) band and the VBI data thus inserted is transmitted. The receiving side may generate EPG display data from the received VBI data to display the generated data on the monitor. In the digital satellite scheme, EPG data is digitized along with original image data and packetized for transmission. The receiving side stores the received EPG data into a memory thereof and generates the display data corresponding to the stored data, displaying the generated data on the monitor.

Conventionally, there exist only methods in which content lists based on EPG are merely presented for example, so that difficulties are apparently encountered in finding particular pieces of content desired by each user.

For example, a program guide display apparatus is proposed (refer to patent document 3 for example) that is capable of displaying program guides that allow the efficient recognition of programs especially desired by each user among many programs that match the preference of each user. In this case, while EPG data of two or more programs are stored, EPG data search is executed by use of an EPG data storage block 102 and keywords for program search to be entered by a user and a program guide in which programs found by this search are arranged on the basis of the information for evaluating each keyword is generated for display.

A system was also proposed in which each user sets keywords (program title, contents, and performer, for example) indicative of preferences (for identifying programs to be viewed) in advance and broadcast content matching these keywords is automatically timer-recorded.

However, there is a problem that even keywords entered by a user himself do not always apparently reflect his preference. Consequently, programs that are not liked by users and therefore unnecessary for them may be recorded, while other programs that are really wanted by users may pass by users without being recorded.

[Patent document 1]
JP-A-H06-504165 (U.S. Pat. No. 5,353,121)
[Patent document 2]
Japanese Patent Laid-open No. Hei 8-111823
[Patent document 3]
Japanese patent Laid-open No. Hei 11-308547

DISCLOSURE OF THE INVENTION

Problems to be Solved by the Invention

It is therefore an object of the present invention to provide an excellent information providing apparatus and information providing method and computer program that are capable of preferably providing information for supporting content viewing selection and other value-added information to users who record, timer-record, or view broadcast content.

Another object of the present invention is to provide an excellent information providing apparatus, information providing method, and computer program, which are capable of preferably providing viewing selection information in which user preference is made apparent on the basis of a user viewing log and other value-added information.

Means for Solving the Problems

In carrying out the invention and according to a first aspect thereof, there is provided an information providing apparatus for providing added-value information associated with content viewing selection, including: a viewing log information acquiring block for acquiring a viewing log associated with viewing of content by a user; a content-associated information acquiring block for acquiring information associated with each piece of content included in a viewing log; an added-information generating block for generating added-information associated with viewing selection of content by a user by aggregating content-associated information for each user; and a presentation-information transmitting block for transmitting a signal to present added-information to a user.

It should also be noted that term "system" as used herein denotes an entire apparatus configured logically by a plurality of component units (or functional modules for realizing a particular function), no matter whether or not these units or modules are accommodated in a single housing.

In the above-mentioned information providing apparatus, the viewing log information acquiring block acquires, as a viewing log, at least one operation log of viewing, recording, timer-recording setting, voting or evaluation, and purchase executed by the user.

In the above-mentioned information providing apparatus, the added-information generating block measures an appearance frequency by attribute type of content-associated information aggregated for each user and, on the basis of attribute values high in appearance frequency in attribute types, generates added-information associated with content viewing selection.

According to the information providing apparatus associated with the present invention, the present invention is intended to provide viewing selection information in which user preference is made apparent on the basis of a user viewing log, and other added information. A server searches a content information database for a piece of content viewed for example on the basis of a viewing log obtained from a user by executing aggregation of data, extracts content tables associated with the content viewed for example, and counts appearance frequencies of the content tables by genre, performer, or keyword. Those genres and performers for example which are ranked high in appearance frequency are indicative of user preferences, so that those genres and performers are provided to the user as viewing support information or added-value information. The presentation-information transmitting block outputs a signal for presenting an added-information screen that includes a list of attribute values high in appearance frequency in each attribute type to the user.

If a user searches for a particular piece of content by use of user-specified keyword, there exists a problem that the specified keyword is not always apparently indicative of a user preference or request. On the other hand, if content-associated information is aggregated by genre, performer or other attributes on the basis of a user viewing log, thereby evaluating a ranking, a result of this ranking (namely, genres and performer names in higher ranking) may indicate that, although what have been already recognized by the user have not been recognized, user preference and request are reflected more apparently, providing effective and useful viewing support information or added-value information.

The information providing apparatus according to the present invention may be realized as a server connected via a network with each CE device for the user to receive and/or record/reproduce content, for example. In this case, the server uploads the user information and viewing log information accumulated on each CE device to the server on the network and aggregates the uploaded user information and the viewing log information for viewed content on a user basis. Then, the server combines the aggregated user viewing log information with the accumulated content-associated information to provide, for each user, the added-value information reflecting the preference of each user.

The aggregation processing (such as ranking) of content viewing logs in the present invention is not executed by integrating the viewing logs of many users but is executed on a user basis. Therefore, viewing log aggregation processing and added-value information creation processing need not be always be executed on the server side in integrated and concentrated manner; that is, the aggregation processing and added-value information creation processing associated with corresponding users may be executed on the CE device side in a restricted and distributed manner.

In the latter case, with a CE device in which the user receives and/or records/reproduces content, the user operation log associated with content viewing and recording/reproduction and the viewing log information such as content voting and evaluation are accumulated in the device beforehand. On the other hand, the user inquires the server to download the information associated with the content included in the viewing log. Then, the content-associated information is aggregated for each attribute type such as genre or performer on the basis of the user viewing log in each CE device to get ranking to generate added-value information, which is provided to the user.

In another method of getting content-associated information on the CE device side, program information provided concurrently with content broadcasting and distribution like EPG may be accumulated in the CE device in advance for use in combination with viewing log information, rather than making an inquiry to a content information database on the server side by use of viewing log information as a search key.

An added-value information screen including a list of attribute values high in appearance frequency in each attribute type has an input block for accepting the specification or selecting operation of attribute values such as genre and performer, for example. The input block is configured screen-imbedded buttons and an anchor for triggering a request for detail added-value information, for example.

In response to the specification or selection by the user of an attribute value, the CE device further searches for the content associated with the specified or selected attribute value and generates detail added-value information on the basis of the retrieved content, the generated detail added-value information being provided to the user.

Detail added-value information is configured by a list of pieces of content including user-specified attribute values. Namely, a detail added-value information screen presents associated viewing content information accumulated in the CE device and viewing content information associated with unbroadcast content. For example, detail added-value information is configured by a list of pieces of content retrieved from viewing log information that have already been recorded or set for timer-recording with respect to user-specified genre or performer. Alternatively, detail added-value information is configured by a list of broadcast-scheduled pieces of content with respect to user-specified genre or performer. At this moment, each individual piece of content information may be configured by an anchor for triggering a request for each detail piece of content information.

The detail added-value information screen has means for starting operation procedures corresponding to the viewing status of each piece of content in the CE device. Means is provided for instantly starting a reproduction procedure in the case of a recorded piece of content and means is provided for instantly setting timer-recording in the case of an unbroadcast piece of content. Namely, a content operation method in accordance with a viewing status such as reproduction or timer-recording is also presented. In response to user's specification or selection of the content operation method on the detail added-value information screen, a corresponding operation such as content reproduction or timer-recording is triggered.

In carrying out the invention and according to a second aspect thereof, there is provided a computer program written in a computer-readable form for making a computer system execute processing for providing added-information associated with content viewing selection, including: a viewing log information acquiring step for acquiring a viewing log associated with viewing of content by a user; a content associated information acquiring step for acquiring information associated with each piece of content included in a viewing log; an added-information generating step for generating added-information associated with viewing selection of content by a user by aggregating content-associated information for each user; and a presentation information transmitting step for outputting a signal to present added-information to a user.

The above-mentioned computer program according to the second aspect of the invention defines a computer program written in a computer-readable form so as to realize predetermined processing on a computer system. In other words, installing the computer program according to the second aspect of the present invention into a computer system realizes a cooperative action thereon to provide substantially the same effect as that of the information providing apparatus according to the first aspect of the present invention.

Effects of the Invention

According to the present invention, an excellent information providing apparatus and information providing method and a computer program are provided for presenting content viewing selection support information and other added-value information to a user who records, timer-records or view broadcast content.

According to the present invention, an excellent information providing apparatus and information providing method and a computer program are provided for preferably providing viewing selection information in which user preference is made apparent on the basis of a user view log and other added-value information.

According to the present invention, added-value information having user inclinations from various points of view by combining a user viewing log with content-associated information is provided, thereby providing means for allowing the user to newly select viewing in large amounts of recorded pieces of content.

Many other features, advantages, and additional objects of the present invention will become manifest to those versed in the art upon making reference to the detailed description which follows and the accompanying sheet of drawings.

BEST MODE FOR CARRYING OUT THE INVENTION

This invention will be described in further detail by way of example with reference to the accompanying drawings.

Now, referring to FIG. 1, there is schematically shown an entire configuration of a content viewing support system practiced as one embodiment of the invention. According to the content viewing support system associated with the present embodiment, viewing log information for viewing content accumulated on each CE device is aggregated for each user and a result of the aggregation of viewing log information is combined with information associated with viewing content to create information having an added value reflecting preference of each user, thereby providing added-value information to each user.

In an example of FIG. 1, one or more CE devices 1 (hereafter referred to also as clients) that operate as content recording/reproducing apparatuses for receiving broadcast content and recording and reproducing the received broadcast content are interconnected with a server 2 for providing added-value information to these CE devices via a wide area network such as the Internet 3 or another form of communication route.

The content recording/reproducing apparatus as a client is configured integrally with a CE device such as a set-top box or a television receiver or as externally connected with a personal computer having a tuner capability for example, thereby accumulating broadcast content continuously distributed from each broadcast station.

In receiving and recording broadcast content, the content recording/reproducing apparatus gets information for identifying content, operation information associated with content recording and reproduction, user viewing log information composed of "voting" for broadcast programs, information associated with user preference, and user profile information.

Also, the content recording/reproducing apparatus is connected to a wide area network such the Internet 3, thereby transmitting (or uploading), to information providing servers, user viewing log information and preference information to an information providing server built on the network and getting recommendation information associated with broadcast content viewing from information providing servers.

The data to be uploaded from the client to the server 2 specifically includes a log of user operations performed on the CE device 1, a content purchase log, information about programs to be timer-recorded by user, information about programs viewed by user, operation information generated so as to represent user preference obtained by executing certain processing on these pieces of information (for example, input information such as voting and evaluation for broadcast programs) or combinations thereof. For example, viewing log information made up of combinations of user identification information, content identification information (or alternate information such as broadcast time zone and broadcast channel that may identify content), and content recording status (indicative whether or not content has already been recorded or set for timer recording) is uploaded from the client to the server 2 in a predetermined timed relation.

On the other hand, the server 2 has databases including: a content information database for managing EPGs of content broadcast from each station and similar program information; a user information database for managing preference information and profiles of users on a user basis; and viewing log information database for managing viewing logs associated with broadcast content viewed, recorded, and set for timer-recorded, and operation logs associated with operations of these devices on a user basis.

The server 2 uploads the user information and viewing log information accumulated on each CE device 1 to the server 2 on the network 3 and the uploaded user information and viewing log information for viewed content are aggregated on a user basis. Then, the aggregated user viewing log information is combined with the accumulated content-associated information to create, of each user, added-value information that reflects the preference of each user.

The server 2 combines the viewing log of content viewed by user with the information associated with viewed content, to aggregate which associated information is often included in which viewed content, and present the aggregation result to the user.

In the content database, a content table 4 is prepared for each content (refer to FIG. 2). The content table 4 is made up of information containing contents of content such as content ID for identifying content, program title, broadcast channel and time zone, genre, performer, program contents, and keyword, for example. The user viewing log is made up of log information for broadcast content viewed by the user (in addition to viewing, information about recording, timer-recording, voting, evaluation, and content purchase are included). From the CE device, not the identification information of the viewed content, but the time zone information indicative of a viewing operation may be transmitted. In the latter case, the server 2 side machetes the time zone information is matched against the content information service for content identification.

On the basis the viewing log aggregated by a user, the server 2 searches the content information database for each content to take out the content table 4 associated with the content, thereby computing the frequency of appearance as classified by genre, performer, or keyword (refer to FIG. 3). A genre or a performer of which frequency of appearance higher in the user viewing log information, for example, are indicative of a user preference and interest, so that these pieces of information are provided to the user as viewing support information or added-value information.

If a user searches for a particular piece of content by use of user-specified keyword, there exists a problem that the specified keyword is not always apparently indicative of a user preference or request. On the other hand, if content-associated information is aggregated by genre, performer or other attributes on the basis of a user viewing log, thereby evaluating a ranking, a result of this ranking (namely, genres and performer names in higher ranking) may indicate that, although what have been already recognized by the user have not been recognized, user preference and request are reflected more apparently, providing effective and useful viewing support information or added-value information.

By combining the operation log of that viewed content of a user with the information associated with that viewed content, the server 2 aggregates which kind of associated information is often included in the which content subject to operation, presenting an aggregation result to the user.

By combining preference information such as a user content voting log with information associated with that viewed content, the server 2 also aggregates which associated information is often included in which voted and evaluated content and presents an aggregation result.

It should be noted that the aggregation of the frequency of appearance in viewing log information such as genre and performer may be executed not only on a viewed content basis, but also extended to as to get exposed scenes of each performer who used face recognition or voice recognition to count the number of exposed scenes on a scene basis, thereby presenting performers having high appearance frequencies.

The following processing is possible as methods of aggregating content associated information.

(1) Same content that appears with repetition and frequently in a particular period of time is counted for each appearance frequency to aggregation. For example, if a programs that is broadcast every weekday are aggregated for a period of one week, this program is counted as 5.

(2) Matching is executed on same content that appears with repetition in a particular period of time and, even if that content appears two or more times, it is aggregated as same count. For example, if a program that is broadcast very weekday is aggregated in a period of one week, this program is counted as one.

Referring to FIG. 4, there is shown a schematic functional configuration of a client apparatus for recording/reproducing content. The client apparatus is configured integrally with a CE device such as a set-top box or a television receiver or as externally connected with a personal computer having a tuner capability for example, thereby accumulating broadcast content continuously distributed from each broadcast station according to the setting of time-recording by the user or predetermined auto-recording reservation (see above).

The CE device 1 has a tuner 11, an encoding block 12, a hard disc unit (HDD) 13, a communication control block 14, a reproduction control block 15, an input unit 16, a television monitor 17, executes apparatus operations associated with content viewing such as content reception, recording, and reproduction under the total control of a central control block 18, and gets content viewing log information of the user on the basis of device operations.

In response to a user operation (executed via the input unit 16, the CE device 1 starts operations such as the reception of a television program and an EPG, the recording of received broadcast content, and the reproduction of recorded content. Obviously, the CE device 1 may also execute operations involved in the reproduction of recorded content such as fast forward, rewind, and pause and erasure of recorded content.

A broadcast wave received at an antenna (not shown) is supplied to the tuner 11. The broadcast wave may be any of ground wave, satellite wave, digital broadcast, and analog broadcast. In accordance with a user command entered through the input unit 16, the tuner 11 tunes in on, or selects, the broadcast wave of a predetermined channel.

In accordance with a user command entered through the input unit 18, the communication control block 14 accesses the predetermined server 2 on the broad-band Internet 3 to upload the user viewing log information obtained in the CE device 1 and download the added-value information associated with viewed content and other information.

The CE device 1 has the HDD 13 as a content accumulation unit for use in recording and reproducing content provided by broadcast waves. The HDD 13 is a storage unit based on magnetic recording. Generally, several magnetic media are accommodated in a drive unit to be rotated by a spindle motor at high speeds. The media are coated with the magnetic substance plated with nickel and phosphor for example. By moving a magnetic head radially over the rotating media and scanning, magnetization equivalent to data is generated on the media to write data or read data. However, the present invention is not limited to the HDD; for example, the HDD may be replaced by other media as long as these are capable of recording/reproducing content.

The broadcast content received by the tuner 11 is encoded by MPEG (Moving Picture Experts Group) for example by the encoding block 12 in the case of analog broadcasting before being accumulated on the HDD 13. In the case of digital broadcasting, the received content has already been encoded, so that the digital content is accumulated on the HDD 13 without change.

The reproduction control block 15 reads the content specified by the user through the input unit 16 from among the content stored on the HDD 13 and controls the reproduction of the read content.

The decoding block 16 decodes the encoded recorded content. The television monitor 17 outputs a decoded audio signal and a decoded video signal.

Referring to FIG. 5, there is shown a schematic functional configuration of a server apparatus. The server 2 is arranged on a wide area network such as the Internet 3 for example, has an upper link with client apparatuses such as the CE device 1, and creates the information having an added value reflecting the preference of each user, providing the created information (as described above).

The server 2 is connected to the Internet 120 through a firewall (F/W) 121 and made up of an application server 100 and a plurality of databases 110 through 112.

A user management database 110 manages account information and user profile about a user of each CE device connected through the Internet 120. A viewing log information database ill manages the content viewing log information (including the information about operations such as timer-recording, recording, reproduction, voting and evaluation in addition to content viewing) made on the CE device of each user. A content information database 112 manages the associated information associated with the content broadcast from each station. Each content information database stores content IDs for identifying content and a content table (described above and refer to FIG. 2) listing, for each piece of content, the information describing the contents of content such as program title, broadcast channel and time zone, genre, performer, program contents or keyword.

The application server 100 has an upload data collection block 101, a viewing log information aggregation block 102, a viewing log information vs. content information search block 103, a corresponding information count block 104, a presentation information creation block 105, and a presentation information transmission block 106.

The upload data collection block 101 collects the data that is uploaded from each CE device. The data to be uploaded from client to server specifically includes the operation log by user on the CE device 1, the program information to be timer-recorded by user, the program information viewed by user, the operation information (for example, the input information such as voting and evaluation for broadcast programs) generated so as to represent user preference obtained by executing certain processing on the foregoing information, or combinations thereof.

The viewing log information aggregation block 102 aggregates the viewing log information uploaded from each CE device for each user and stores aggregation results into the viewing log information database 111. In the present embodiment, the viewing log information of each user is not integrated with that of other users, so that the viewing log information is aggregated on a user basis.

The viewing log information vs. content information search block 103 starts in response to a user request from the CE device to search for the relationship between the viewing log information aggregated from the user as a requestor and the content information stored in the content information database 112. To be more specific, the viewing log information vs. content information search block 103 searches each piece of content included in the viewing log information stored in the content information database 112 for an associated content table.

The corresponding information count block 104 counts the content tables extracted on the basis of the relationship with the viewing log information. To be more specific, the corresponding information count block 104 measures the frequency of appearance of the content in the viewing log information by attribute type such as genre, performer, or keyword.

The presentation information creation block 105 generates added-value information including a list of attribute values with their appearance frequencies ranked high in the attribute types in each viewing log on the basis of results of the aggregation of appearance frequencies by attribute type. Then, the presentation information transmission block 106 transmits the generated added-value information to the user as a requestor via the Internet 120, thereby supporting content viewing selection. A specific configuration of an added-value information screen will be described later.

Searching for content concerned by use of a user-specified keyword involves a problem that the keyword does not always apparently reflects a user preference or request. In contrast, in the present embodiment, the content-associated information is aggregated for each of the attribute types such as genre and performer on the basis of each user viewing log, thereby ranking the genres and performers. Although a result of the ranking (namely, the genres and performers in higher ranks) has already been recognized by the user or not, the result indicates the user preference or request more correctly, thereby possibly providing effective and useful viewing support information or added-value information.

The following describes an operation of the content viewing support system practiced as the present embodiment with reference to FIG. 6.

Content viewing log information of the user obtained in the CE device 1 (the viewing log for user viewing content, the operation log such as timer-recording, the preference information such as voting and evaluation results, and the purchase log of content-associated products) is uploaded to the application server 100 via the Internet 120 (step S1).

The uploaded user viewing log information is user-authenticated for example via the upload data collection block 101 to be extracted by an user information collecting block 102 as proper information, which is then stored in the viewing log information database 111 (step S11).

Viewing log information is configured by combinations of user identification information, content identification information (or alternate information such as broadcast time zone and broadcast channel that may identify content), and recording status of content (recorded or timer-recorded or not), for example. The uploading of user's viewing log information is triggered periodically or when any service pages that trigger uploading is accessed (as described above).

Next, the user executes an operation on the CE device 1 or a Web page to transmit a request for added-value information to an application server (step S2). At this moment, the user selects a proper one from among the following combinations of viewing log information and viewing content associated information and specifies a user information period subject to processing (the character string enclosed by parentheses is indicative of a service image name of category (attribute type)).

timer-recording already set: performer information ("Performers scheduled to appear often from now on")
  timer-recording already set: genre information ("To be addicted to this genre from now on")
  timer-recording already set: keyword information ("This keyword from now on")
  Viewing log: performer ("Your favorite performer")
  Viewing log: genre ("Your favorite genre")
  Viewing log: keyword ("Your favorite keyword")
  Voting log: performer "Your favorite performer")
  Voting log: genre ("Your favorite genre")
  Voting log: keyword ("Your favorite keyword")

Receiving a request for added-value information, the application server 100 searches the content information database 112 for content-associated information (a content table) accompanying the viewing log information of the user as a requestor (step S12), in the viewing log information vs. content information search block 103. Further, the corresponding information count block 104 counts extracted content tables to measure the frequency of appearance in the viewing log information, by attribute type such as genre, performer, or keyword, thereby executing ranking (step S13).

Next, on the basis of an appearance frequency of the aggregated pieces of content, the presentation information creation block 105 determines a sequence of the content-associated information in accordance with the appearance frequency to create the added-value information to be presented to the user (step S14). The added-value information is configured by a list of attribute values ranked high in appearance frequency in each attribute type in each viewing log. Highly ranked genres and performer names may have already been recognized or not by the user, but these genres and performer names reflect user preference and request more correctly, thereby providing effective and useful viewing support information or added value information.

The created added-value information is transmitted to the CE device 1 of the user as a requestor via the presentation information transmission block 106 to be presented to the user through a television monitor screen (step S3).

Referring to FIG. 7, there is shown an exemplary configuration of an added-value information screen which is presented when genre information is specified by the user as attribute type. In the example shown, appearance frequencies and genre names are listed in the descending order of appearance frequency in the viewing log information by genre, which are shown with an information period selected by the user.

In the display area of each genre name in the display screen shown in the figure, a link for requesting the presentation of detail added-value information associated with genre name is embedded. When the link of a certain genre name is clicked (step S4), then a request for the detail added-value information about that genre name is transmitted to the application server 100.

In the application server 100, the viewing log information vs. content information search block 103 searches for the correlation between the specified genre name and the viewing log information of the user as a requestor (step S15) and then the correlation with EPG and other program schedule information (step S16). Next, the presentation information creation block 105 creates detail added-value information made up of a list of pieces of content corresponding to the specified genre names among the pieces of content stored (or recorded) in the CE device 1 of the user as a requestor and the pieces of content scheduled to be broadcast in the future (step S17). The created detail added-value information is transmitted to the CE device 1 of the user as a requestor via the presentation information transmission block 106 to be presented to the user through a television monitor screen (step S5).

Referring to FIG. 8, there is shown an exemplary configuration of a detail added-value information screen that is newly displayed in response to the specification of genre name "succor" from the user on the added-value information screen shown in FIG. 7. In the example shown, of the recorded pieces of content in the CE device 1 and the pieces of content scheduled to be broadcast, a list of the pieces of content corresponding to genre name "succor" is displayed separately for each of viewing statuses such as "already recorded" and "scheduled to be broadcast".

The detail added-value information screen shown has buttons for starting operation procedures corresponding to the viewing status of each piece of content. Namely, a play button is provided for instantly starting a reproduction procedure in the case of a recorded piece of content and a timer button is provided for instantly setting timer-recording in the case of an unbroadcast piece of content.

The detail added-value information screen shown has links to more detail information of each piece of content. The user may get the information of detail about each piece of content by clicking these links.

Referring to FIG. 9, there is shown an exemplary configuration of an added-value information screen to be presented when a performer name is specified by the user as attribute type. In the example shown, appearance frequencies and performer names are listed in the descending order of appearance frequency in the viewing log information by performer are shown with an information period selected by the user.

In the display area of each performer name in the display screen shown in the figure, a link for requesting the presentation of detail added-value information associated with performer name is embedded. When the link of a certain performer name is clicked (step S4), then a request for the detail added-value information about that performer name is transmitted to the application server 100.

In the application server 100, the viewing log information vs. content information search block 103 searches for the correlation between the specified performer name and the viewing log information of the user as a requestor (step S15) and then the correlation with EPG and other program schedule information (step S16). Next, the presentation information creation block 105 creates detail added-value information made up of a list of pieces of content corresponding to the specified performer names among the pieces of content stored (or recorded) in the CE device 1 of the user as a requestor and the pieces of content scheduled to be broadcast in the future (step S17). The created detail added-value information is transmitted to the CE device 1 of the user as a requestor via the presentation information transmission block 106 to be presented to the user through a television monitor screen (step S5).

Referring to FIG. 10, there is shown an exemplary configuration of a detail added-value information screen that is newly displayed in response to the specification of performer name "Ohide Junya" from the user on the added-value information screen shown in FIG. 9. In the example shown, of the recorded pieces of content in the CE device 1 and the pieces of content scheduled to be broadcast, a list of the pieces of content corresponding to performer name "Ohide Junya" is displayed separately for each of viewing statuses such as "already recorded" and "scheduled to be broadcast".

The detail added-value information screen shown has buttons for starting operation procedures corresponding to the viewing status of each piece of content. Namely, a play button is provided for instantly starting a reproduction procedure in the case of a recorded piece of content and a timer button is provided for instantly setting timer-recording in the case of an unbroadcast piece of content (as described above).

The detail added-value information screen shown has links to more detail information of each piece of content. The user may get the information of detail about each piece of content by clicking these links (as described above).

Referring to FIG. 11, there is shown another exemplary configuration of a detail added-value information screen. In the example shown, when only a performer name is specified by the user as attribute type, detail added-value information sheets for performers are prepared for the number of performers in high ranking in the viewing log information by performer. In configuration, in each detail added-value information sheet, performers of high rank in appearance frequency in the viewing log information by performer are sequentially arranged starting with a left-hand tab, thereby presenting a list of pieces of content not yet broadcast associated with that performer. As with the screen configuration shown in FIG. 10, the content list may include a list of pieces of content in which that performer performs, as classified by viewing status such as "already recorded" and "scheduled to be broadcast". By selecting a performer name tab, the user is able to display the detail added-value information sheet of each desired performer onto the front and, by tracing links to content information, get detail information of content concerned.

The aggregation processing (such as ranking) of content viewing logs in the present invention is not executed by integrating the viewing logs of many users but is executed on a user basis. Therefore, as with the embodiment shown in FIG. 1, viewing log aggregation processing and added-value information creation processing need not be always be executed on the server side in integrated and concentrated manner; that is, the aggregation processing and added-value information creation processing associated with corresponding users may be executed on the CE device side in a restricted and distributed manner.

Referring to FIG. 12, there is schematically shown a configuration of a content viewing support system practiced as a second embodiment of the invention.

In the case of the embodiment shown, each CE device 1 for receiving and/or recording/reproducing content by the user stores in advance a user operation log associated with content viewing and recording/reproducing and viewing log information such as content voting and evaluation.

If the user requests added-value information, the CE device inquires a content information database on the server side to download the information associated with the content included in the user viewing log.

Next, the content-associated information is aggregated by attribute type such as genre or performer on the basis of the user viewing log in the CE device 1 to execute ranking and added-value information is created to be presented to the user. Further, in response to a user request made through the added-value information screen, the CE device 1 may present the detail added-value information associated with specified attribute values.

It is also practicable for a method of acquiring content-associated information on the CE device 1 to accumulate program information provided concurrently with content broadcasting and distribution like EPG into the CE device 1 in advance for use in combination with viewing log information, rather than making an inquiry to a content information database on the server side by use of viewing log information as a search key.

Referring to FIG. 13, there is schematically shown a configuration of a content viewing support system practiced as a third embodiment of the invention.

In the embodiment shown, each CE device 1 for receiving and/or recording/reproducing content by the user stores in advance a user operation log associated with content viewing and recording/reproducing and viewing log information such as content voting and evaluation. The CE device 1 also receives viewing content information distributed in the form of EPG or others concurrently with the main content and builds, inside the CE device 1, the content-associated information equivalent to a content information database in advance.

If the user requests added-value information, the CE device 1 searches the content-associated information built in advance inside the CE device 1 for the information associated with the content included in the user viewing log.

Then, inside the CE device 1, the content-associated information is aggregated by attribute type such as genre or performer on the basis of the user viewing log to execute ranking and added-value information is generated to present to the user. Further, in response to a user request made through the added-value information screen, the CE device 1 may present the detail added-value information associated with specified attribute values.

INDUSTRIAL APPLICABILITY

The present invention has been described hereinbefore with reference to specified embodiments. However, it is obvious that changes and variations are able to be made without departing from the spirit or scope of the following claims by those skilled in the art. In other words, since the present invention has been disclosed by explaining with examples, the present description should not be interpreted to a limited extent. The substance of the present invention should be understood by following the claims.

BRIEF DESCRIPTION OF THE DRAWINGS

FIG. 12 is a schematic diagram illustrating an entire configuration of a content viewing support system practiced as a second embodiment of the invention.

FIG. 13 is a schematic diagram illustrating an entire configuration of a content viewing support system practiced as a third embodiment of the invention.

DESCRIPTION OF REFERENCE NUMERALS

Figure 1:
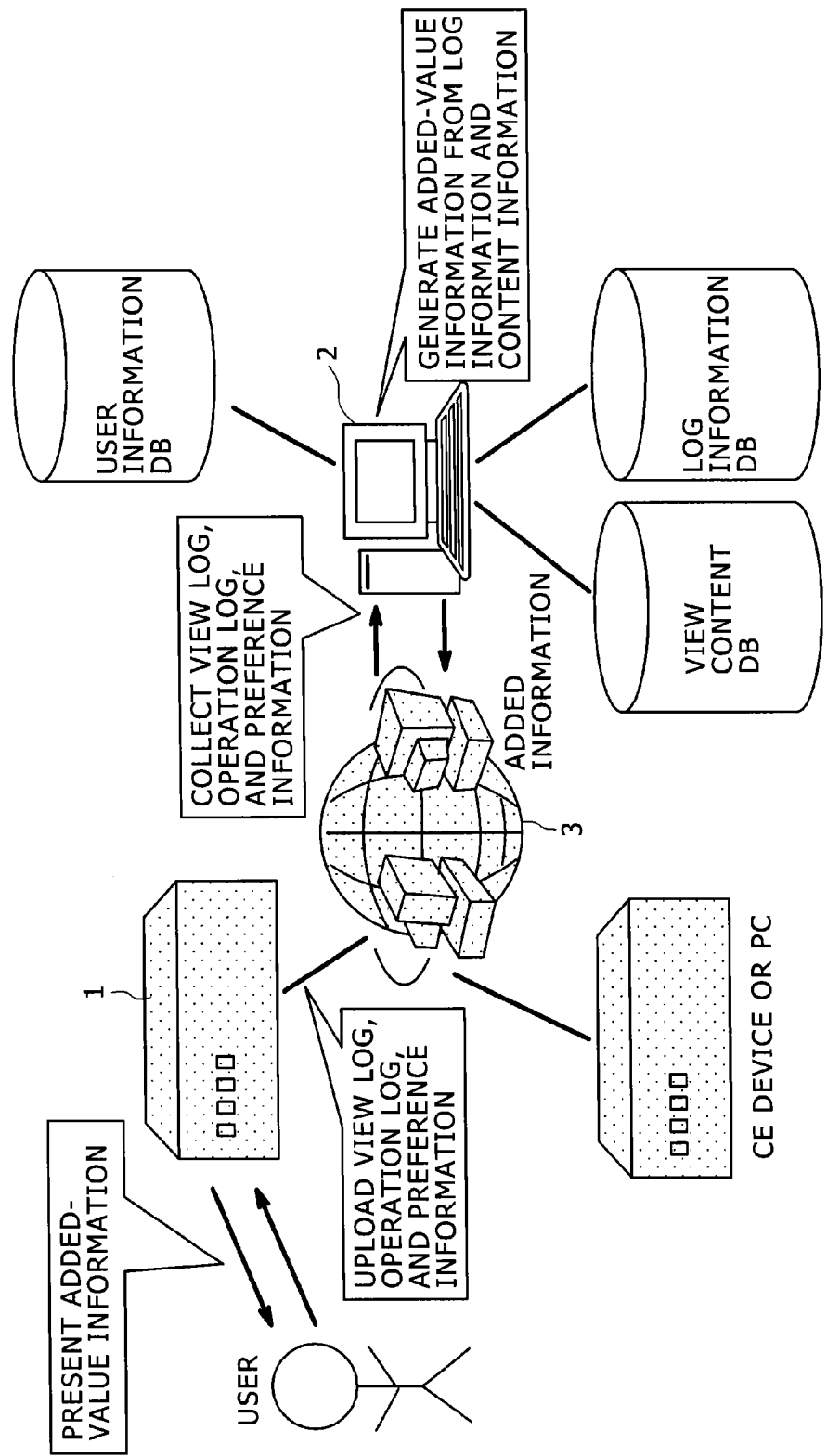
FIG. 1 is a schematic diagram illustrating an entire configuration of a content viewing support system practiced as one embodiment of the invention.
Figure 2:
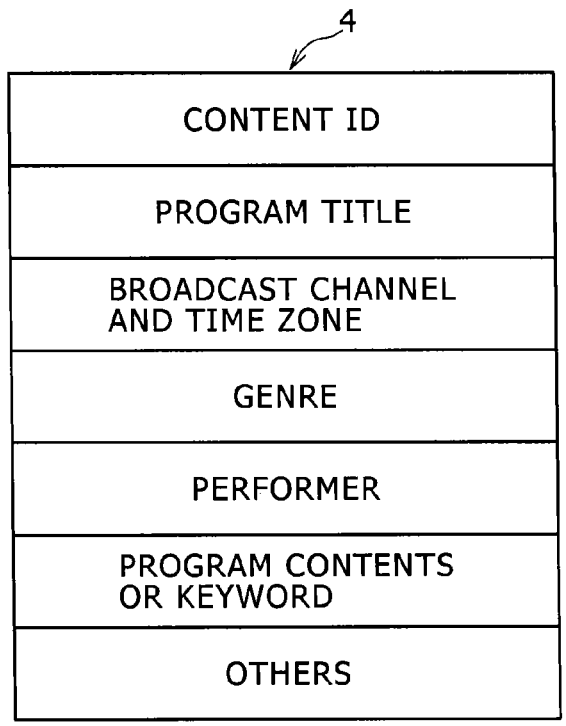
FIG. 2 is a schematic diagram illustrating an exemplary configuration of a content table.
Figure 3:
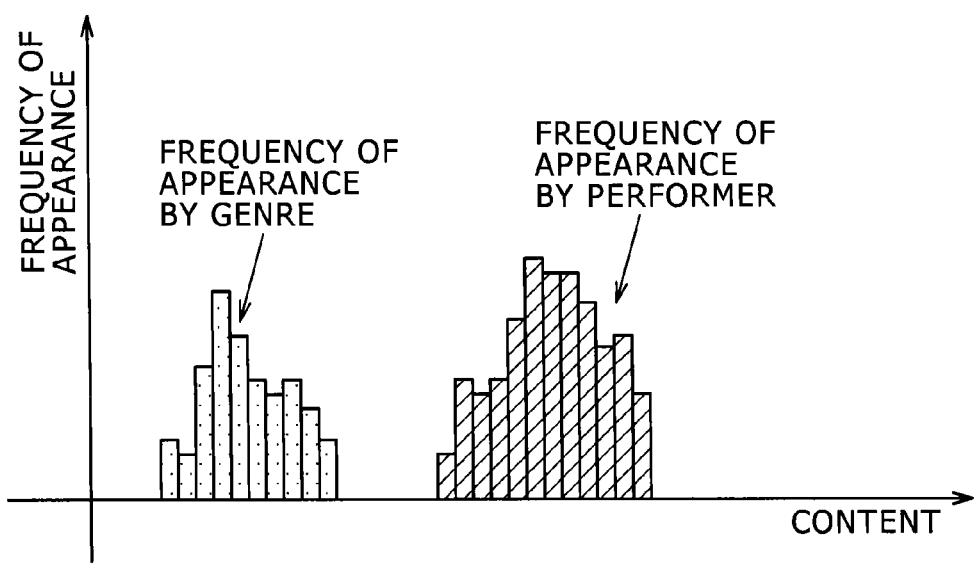
FIG. 3 is a schematic diagram illustrating an exemplary configuration of ranking information created for each user.
Figure 4:
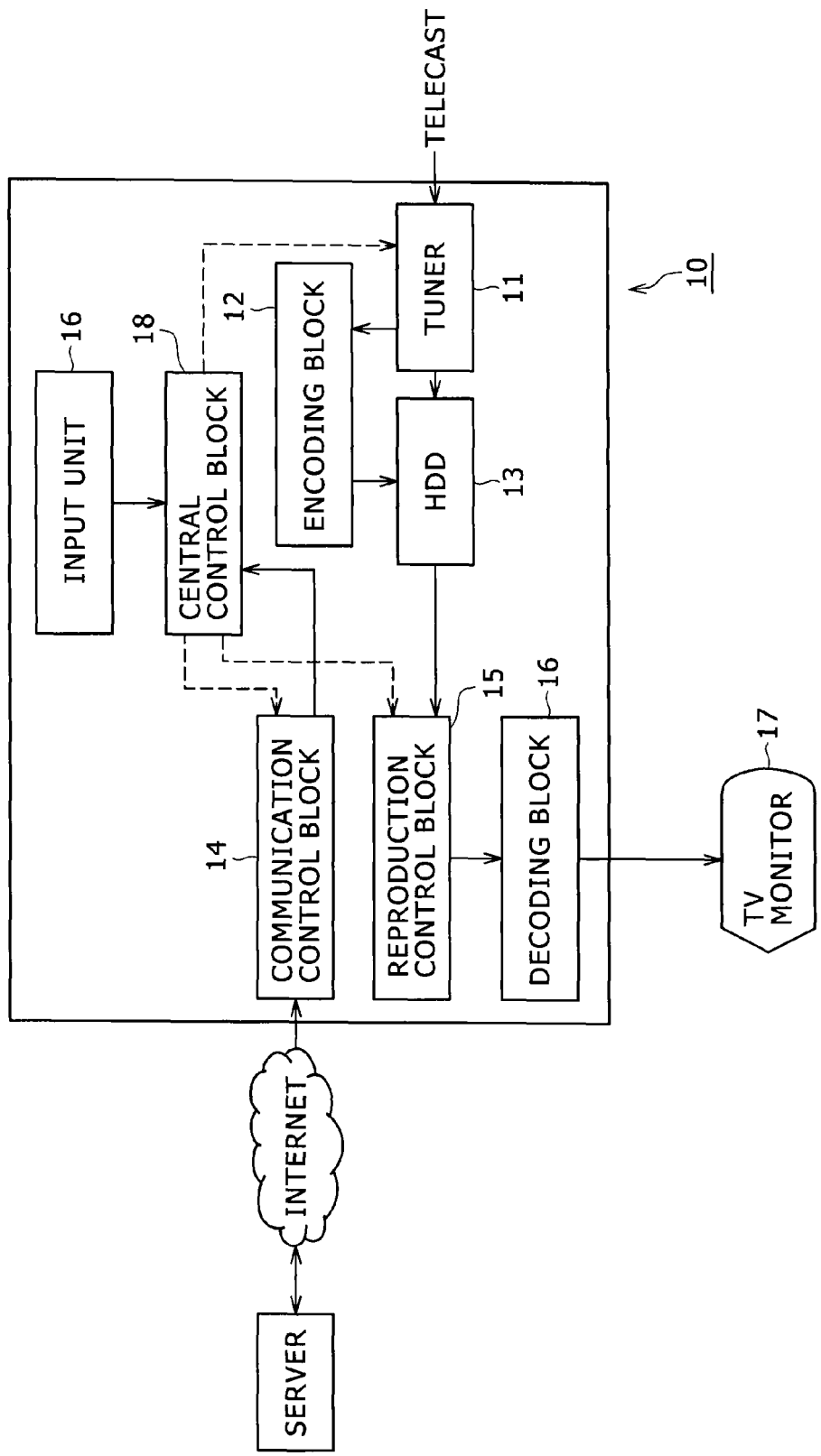
FIG. 4 is a schematic diagram illustrating a functional configuration of a client apparatus for recording and reproducing content.
Figure 5:
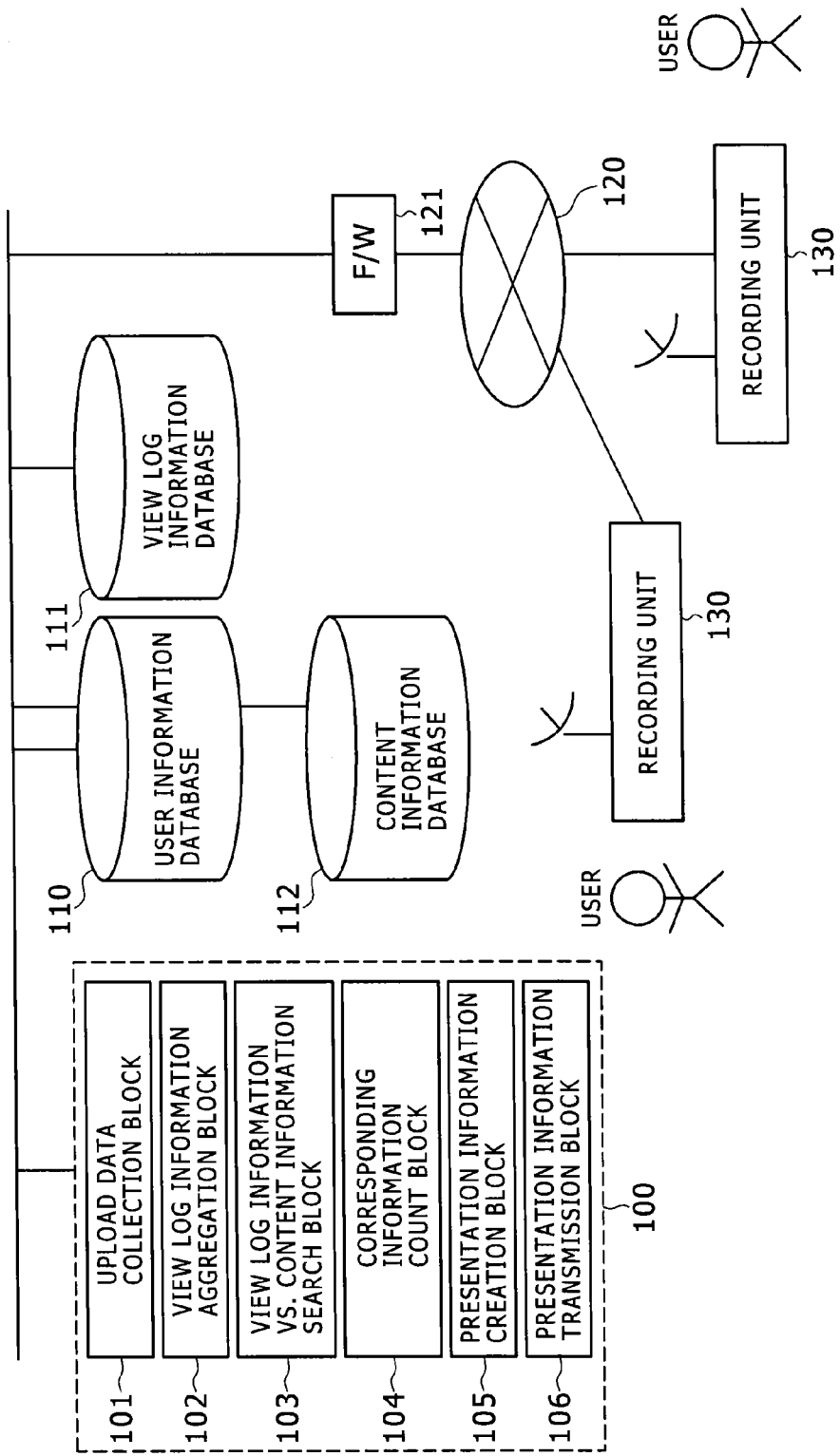
FIG. 5 is a schematic diagram illustrating a functional configuration of a server apparatus.
Figure 6:
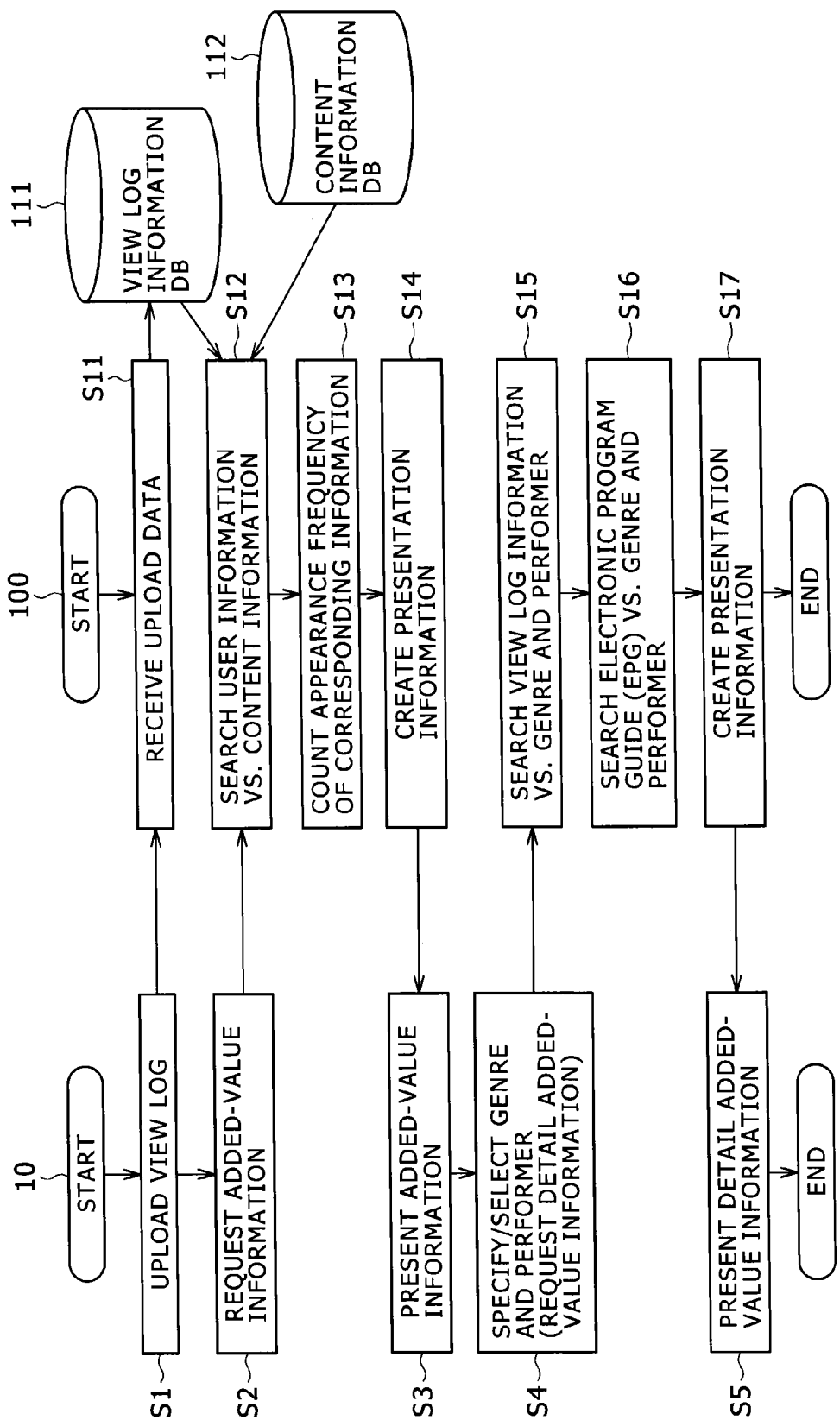
FIG. 6 is a diagram for describing an operation of a content viewing support system associated with the present invention.
Figure 7:
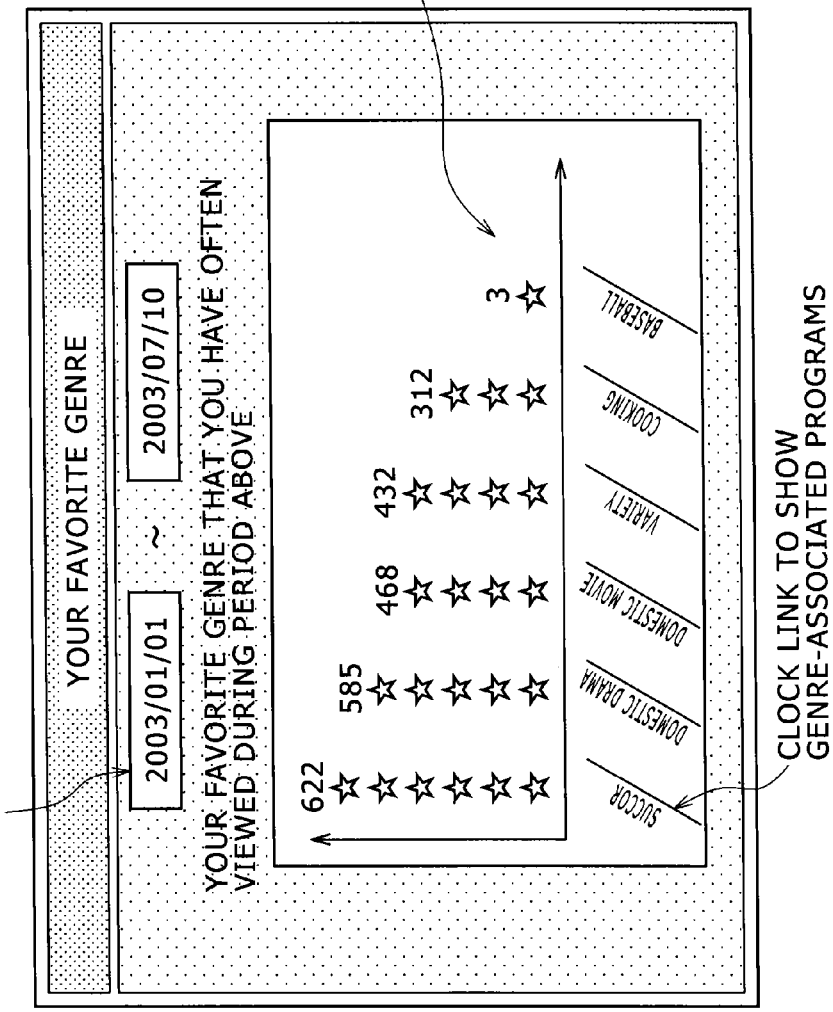
FIG. 7 is a diagram illustrating an exemplary configuration of a added-value information to be presented when genre information is specified by a user.
Figure 8:
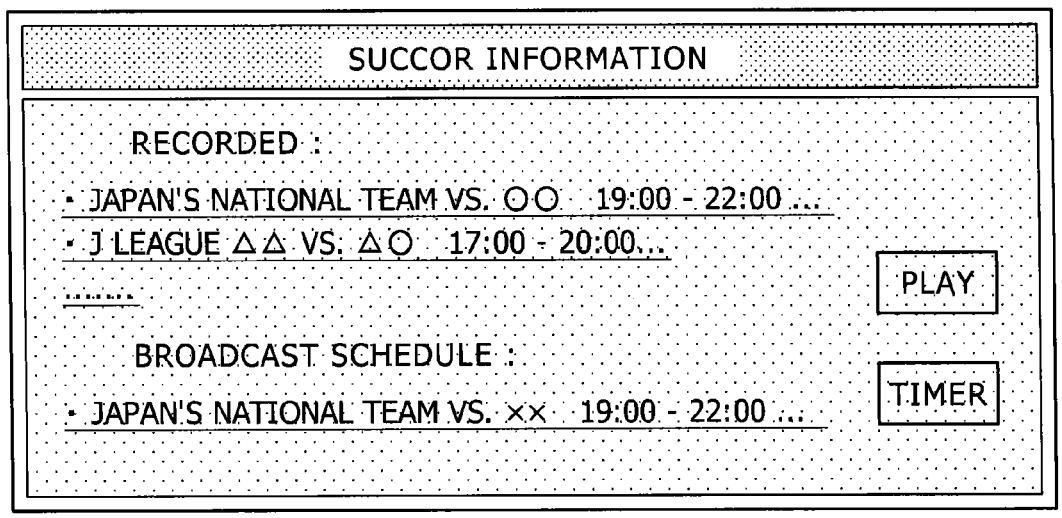
FIG. 8 is a diagram illustrating an exemplary configuration of a detail added-value information screen to be newly presented in response to the specification of "succor" by a user on the added-value information screen shown in FIG. 7.
Figure 9:
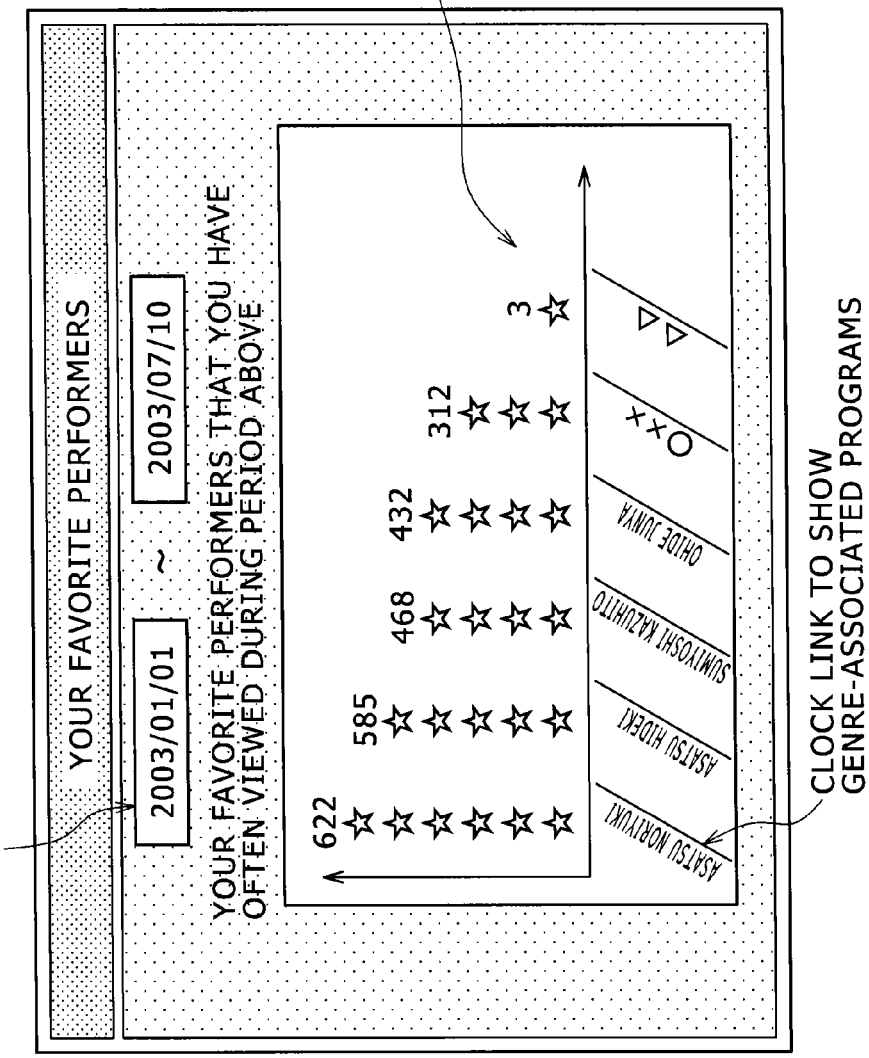
FIG. 9 is a diagram illustrating an exemplary configuration of an added-value information screen to be presented when a performer name is specified by a user as an attribute type.
Figure 10:
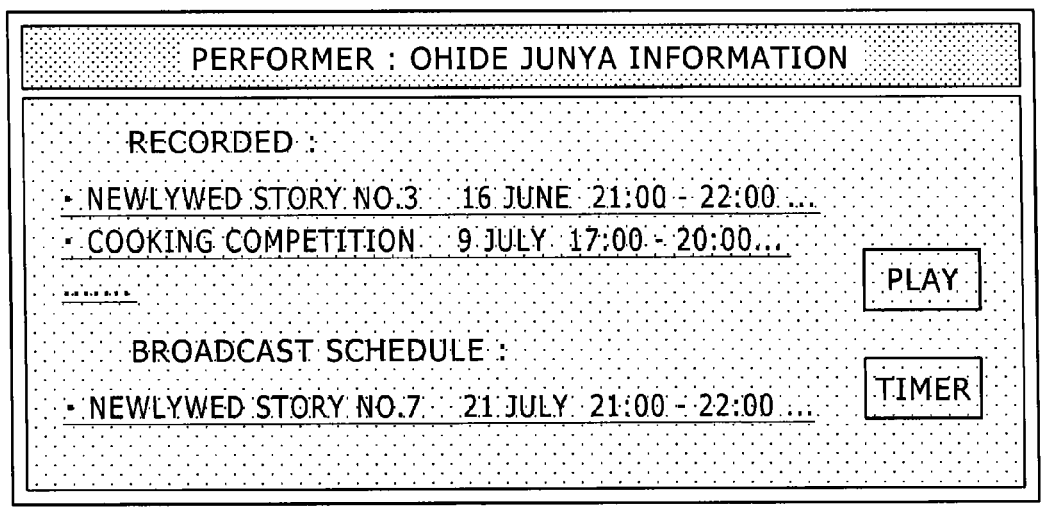
FIG. 10 is a diagram illustrating an exemplary configuration of a detail added-value information screen to be newly presented in response to the specification of performer name "Ohide Junya" by a user on the added-value information screen shown in FIG. 9.
Figure 11:
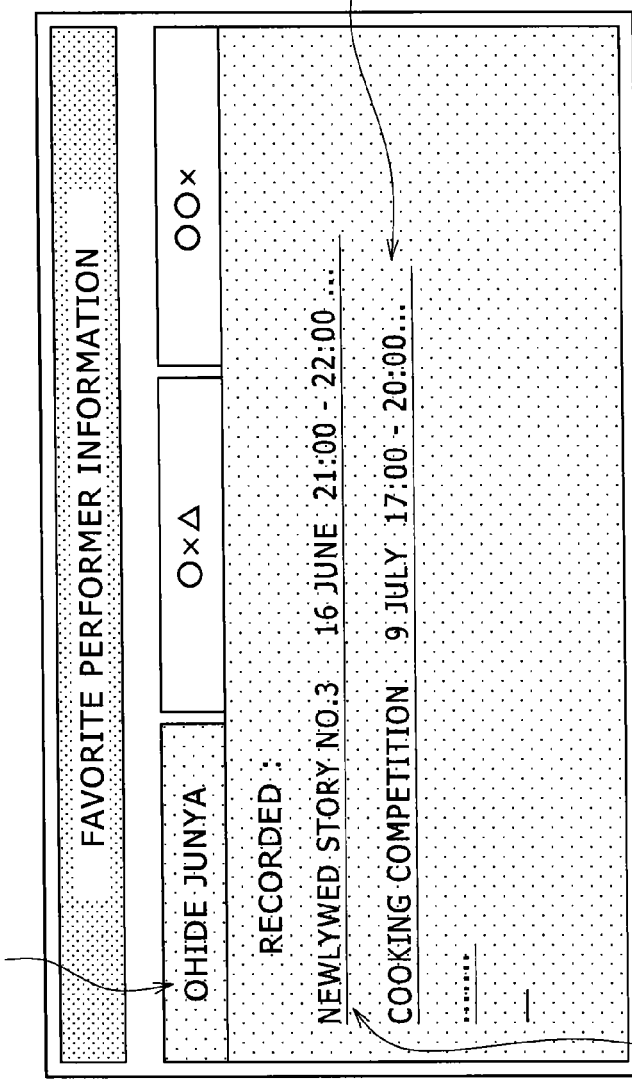
FIG. 11 is a diagram illustrating another exemplary configuration of the detail added-value information screen.

1 . . . CE device
2 . . . server
3 . . . Internet
11 . . . tuner
12 . . . encoding block
13 . . . HDD
14 . . . communication control block
15 . . . reproduction control block
16 . . . decoding block
17 . . . television monitor
18 . . . central control block
100 . . . application server
101 . . . upload data collection block
102 . . . viewing log information aggregation block
103 . . . viewing log information vs. content information search block
104 . . . corresponding information count block
105 . . . presentation information creation block
106 . . . presentation information transmission block
110 . . . user management database
111 . . . viewing log information database
112 . . . content information database
120 . . . Internet
121 . . . firewall

The invention claimed is:

1. An apparatus, comprising:
circuitry connected to a server via a communication network, the circuitry configured to:
acquire log information, wherein the log information identifies content watched or recorded by a user, the content having attribute values in plural attribute categories;
display the plural attribute categories;
receive an input that selects one of the plural attribute categories;
search the log information for content having attribute values for the selected attribute category;
display the attribute values for the selected attribute category in a descending order of appearance count of each attribute value found in the log information;
receive an input that selects an attribute value from the displayed attribute values; and
display detailed information for recorded and broadcast content having the selected attribute value, wherein the detailed information includes a list of content recorded in the apparatus and a list of content scheduled to be broadcast.

2. The apparatus according to claim 1, wherein the log information includes items of information that identify one or more of: content viewed by the user, content evaluated by the user, and content selected by the user for viewing, purchase, or recording.

3. The apparatus according to claim 1, wherein the detailed information includes a timer button to initiate a timer function with respect to the broadcast content.

4. The apparatus according to claim 3, wherein the timer function is a time-recording function to record the broadcast content.

5. The apparatus according to claim 1, wherein the detailed information includes a button to initiate viewing of the recorded or the broadcast content.

6. The apparatus according to claim 1, wherein the log information includes voting of the user regarding the content watched or recorded by the user.

7. The apparatus according to claim 1, wherein the circuitry is configured to receive the input that selects one of the plural attribute categories and the input that selects the attribute value from the user.

8. The apparatus according to claim 1, wherein the attribute values for the selected attribute category include, for each of the attribute values, a link to the detailed information, wherein the detailed information includes a program list that lists programs corresponding to the respective one of the attribute values.

9. A method, comprising:
acquiring log information, wherein the log information identifies content watched or recorded by a user, the content having attribute values in plural attribute categories;
displaying, using circuitry, the plural attribute categories;
receiving an input to select one of the plural attribute categories;
searching the log information for content having attribute values for the selected attribute category;
displaying the attribute values for the selected attribute category in a descending order of appearance count of each attribute value found in the log information;
receiving an input to select an attribute value from the displayed attribute values; and
displaying detailed information for recorded and broadcast content having the selected attribute value, wherein the detailed information includes a list of recorded content and a list of content scheduled to be broadcast.

10. The method according to claim 9, further comprising receiving log information including voting of the user regarding the content watched or recorded by the user.

11. The method according to claim 9, wherein the input that selects one of the plural attribute categories and the input that selects the attribute value are received from the user.

12. A non-transitory computer-readable medium including executable instructions, which when executed by circuitry, cause the circuitry to perform steps comprising:
acquiring log information, wherein the log information identifies content watched or recorded by a user, the content having attribute values in plural attribute categories;
displaying the plural attribute categories;
receiving an input to select one of the plural attribute categories;
searching the log information for content having attribute values for the selected attribute category;
displaying the attribute values for the selected attribute category in a descending order of appearance count of each attribute value found in the log information;
receiving an input to select an attribute value from the displayed attribute values; and
displaying detailed information for recorded and broadcast content having the selected attribute value, wherein the detailed information includes a list of recorded content and a list of content scheduled to be broadcast.

13. The non-transitory computer-readable medium according to claim 12, further comprises receiving log information including voting of the user regarding the content watched or recorded by the user.

14. The non-transitory computer-readable medium according to claim 12, wherein the input that selects one of the plural attribute categories and the input that selects the attribute value are received from the user.

* * * * *